US012265857B2

(12) United States Patent
Wang et al.

(10) Patent No.: US 12,265,857 B2
(45) Date of Patent: Apr. 1, 2025

(54) METHOD OF MANAGING RESOURCES, ELECTRONIC DEVICE, AND COMPUTER PROGRAM PRODUCT

(71) Applicant: EMC IP Holding Company LLC, Hopkinton, MA (US)

(72) Inventors: Qi Wang, Shanghai (CN); Ren Wang, Shanghai (CN); Yun Zhang, Shanghai (CN); Ming Zhang, Shanghai (CN); Weiyang Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 572 days.

(21) Appl. No.: 17/522,222

(22) Filed: Nov. 9, 2021

(65) Prior Publication Data

US 2023/0099366 A1 Mar. 30, 2023

(30) Foreign Application Priority Data

Sep. 30, 2021 (CN) ........................... 202111162439.0

(51) Int. Cl.
*G06F 9/50* (2006.01)
(52) U.S. Cl.
CPC .......... *G06F 9/5055* (2013.01); *G06F 9/5066* (2013.01)
(58) Field of Classification Search
CPC ............................. G06F 9/5055; G06F 9/5066
See application file for complete search history.

(56) References Cited

U.S. PATENT DOCUMENTS

| 7,814,204 | B1 * | 10/2010 | Wang | H04L 67/02 |
| | | | | 709/227 |
| 11,574,243 | B1 * | 2/2023 | Mallya Kasaragod | |
| | | | | G06F 9/5044 |
| 2008/0172673 | A1 * | 7/2008 | Naik | G06F 9/5083 |
| | | | | 718/104 |
| 2009/0132602 | A1 * | 5/2009 | Brown | G06F 16/217 |
| 2009/0157678 | A1 * | 6/2009 | Turk | G06F 16/24552 |
| 2016/0043970 | A1 * | 2/2016 | Jacob | H04L 67/60 |
| | | | | 709/226 |
| 2019/0325033 | A1 * | 10/2019 | Liu | G06F 16/93 |
| 2019/0361785 | A1 * | 11/2019 | Ledet | G06F 16/687 |
| 2021/0248205 | A1 * | 8/2021 | Tank | G06F 16/986 |
| 2021/0390251 | A1 * | 12/2021 | Swvigaradoss | G06F 40/174 |

* cited by examiner

*Primary Examiner* — April Y Blair
*Assistant Examiner* — Jonathan R Labud
(74) *Attorney, Agent, or Firm* — WOMBLE BOND DICKINSON (US) LLP (57) ABSTRACT

A method of managing resources is provided in embodiments of the present disclosure. The method includes determining a set of candidate historical requests associated with a target request. Here, the set of candidate historical requests has the same request type and target resource as the target request. The method further includes determining a target request pattern of the target request based on at least one previous request of the target request. The method includes determining a target historical request from the set of candidate historical requests based on the target request pattern. The method includes generating a target response to the target request based on a historical response to the target historical request. In this way, by determining a response to a historical request that has the most similar request pattern to the target request, a simulated response that is more in line with the context can be generated.

20 Claims, 6 Drawing Sheets

METHOD OF MANAGING RESOURCES, ELECTRONIC DEVICE, AND COMPUTER PROGRAM PRODUCT

CROSS-REFERENCE TO RELATED APPLICATION

This patent application claims priority, under 35 U.S.C. § 119, of Chinese Patent Application No. 202111162439.0, filed Sep. 30, 2021, which is incorporated by reference in its entirety.

TECHNICAL FIELD

Embodiments of the present disclosure relate to the field of computers, and more specifically, to a method of managing resources, an electronic device, and a computer program product.

BACKGROUND

Nowadays, software has become more and more complex, and the demand for software has also become more dynamic. In the software industry, a new architecture, i.e., microservice, has been introduced. Authoring complex software can be more flexible by using the microservice architecture. In order to implement a new end-to-end function, a plurality of microservices may need to work together. In this regard, a calling regulation is very important, because it is a bridge between microservices. The most commonly used regulation between microservices is a presentation layer state transition application programming interface REST API. A specification associated with the REST API is an OpenAPI specification OAS. The OAS defines a URI, an input pattern, and an output pattern, and can be used to generate mock servers. When a sample input is given, a pattern defined by the OAS is used to generate a sample output.

SUMMARY OF THE INVENTION

A solution for managing resources is provided in embodiments of the present disclosure.

In a first aspect of the present disclosure, a method of managing resources is provided. The method includes determining a set of candidate historical requests associated with a target request, the set of candidate historical requests having the same request type and target resource as the target request. The method further includes determining a target request pattern of the target request based on at least one previous request of the target request. The method further includes determining a target historical request from the set of candidate historical requests based on the target request pattern. The method also includes generating a target response to the target request based on a historical response to the target historical request.

In a second aspect of the present disclosure, an electronic device is provided. The electronic device includes a processor and a memory coupled to the processor. The memory has instructions stored therein, and the instructions, when executed by the processor, cause the device to perform actions comprising: determining a set of candidate historical requests associated with a target request. Here, the set of candidate historical requests has the same request type and target resource as the target request. The action further includes determining a target request pattern of the target request based on at least one previous request of the target request. The action further includes determining a target historical request from the set of candidate historical requests based on the target request pattern. The action further includes generating a target response to the target request based on a historical response to the target historical request.

In a third aspect of the present disclosure, a computer program product is provided. The computer program product is tangibly stored on a computer-readable medium and includes machine-executable instructions. When executed, the machine-executable instructions cause a machine to perform the method according to the first aspect.

The Summary of the Invention is provided to introduce simplified form a selection of concepts that are further described in the following specific embodiments. The Summary of the Invention is not intended to identify key features or essential features of the present disclosure, and is also not intended to limit the scope of the present disclosure.

BRIEF DESCRIPTION OF THE DRAWINGS

By describing exemplary embodiments of the present disclosure in more detail in conjunction with the accompanying drawings, the above and other objects, features, and advantages of the present disclosure will become more apparent, wherein the same reference numerals in the exemplary embodiments of the present disclosure generally represent the same components. In the accompanying drawings.

DETAILED DESCRIPTION

The principles of the present disclosure will be described below with reference to several exemplary embodiments illustrated in the drawings. Although the drawings show preferred embodiments of the present disclosure, it should be understood that these embodiments are merely described to enable those skilled in the art to better understand and further implement the present disclosure, and not in any way limit the scope of the present disclosure.

The term used herein, "comprising" and variations thereof indicates an open inclusion, i.e., "including but not limited to." Unless otherwise stated, the term "or" means "and/or." The term "based on" means "based at least in part on." The terms "an example embodiment" and "an embodiment" mean "at least one example embodiment." The term "another embodiment" means "at least one further embodiment." The terms "first," "second," and the like may refer to different or the same objects. The following may also include other explicit and implicit definitions.

As discussed above, in general, one microservice may be associated with a plurality of other microservices. For example, microservice A, microservice B, and microservice C are associated with each other. When a new function is developed, for example, to test microservice B, it is necessary to simulate microservice A to obtain a response output and input it into microservice B.

Conventionally, an OAS definition may be used to generate a simulation server. The simulation server uses the OAS specification as a configuration file and generates an output according to a response pattern. For example, in the case of interaction between microservices following REST API, a request based on the Hypertext Transfer Protocol HTTP will be provided, which includes a requested action or a request type and a resource identifier of a targeted resource. In response to this request, the simulation server will output a corresponding response. However, when the simulation is performed based on OAS, when the workflow is complicated, that is, when a plurality of requests are associated with each other, the response output by the OAS-based simulation server still indicates that the response is for a single request, and cannot reflect the relation between the various requests. As a result, some characteristics of microservices cannot be simulated. Therefore, it is desired that the workflow of the microservice can be simulated more effectively to improve engineering efficiency.

The embodiment of the present disclosure proposes a solution for simulation using historical requests and response data to solve one or more of the above problems and other potential problems. In this solution, a pattern of a historical request can be determined based on a request type (that is, a requested action) of the historical request and a resource targeted by the request. A target historical request that has the same request type and targets the same resource as the target request is selected from historical requests, and then based on a response to the selected target historical request, a target response based on a request pattern and a historical response and for the target request can be generated. In this way, it is possible to generate a non-random response that is more in line with the actual situation, thereby improving the accuracy of the simulation.

Figure 1:
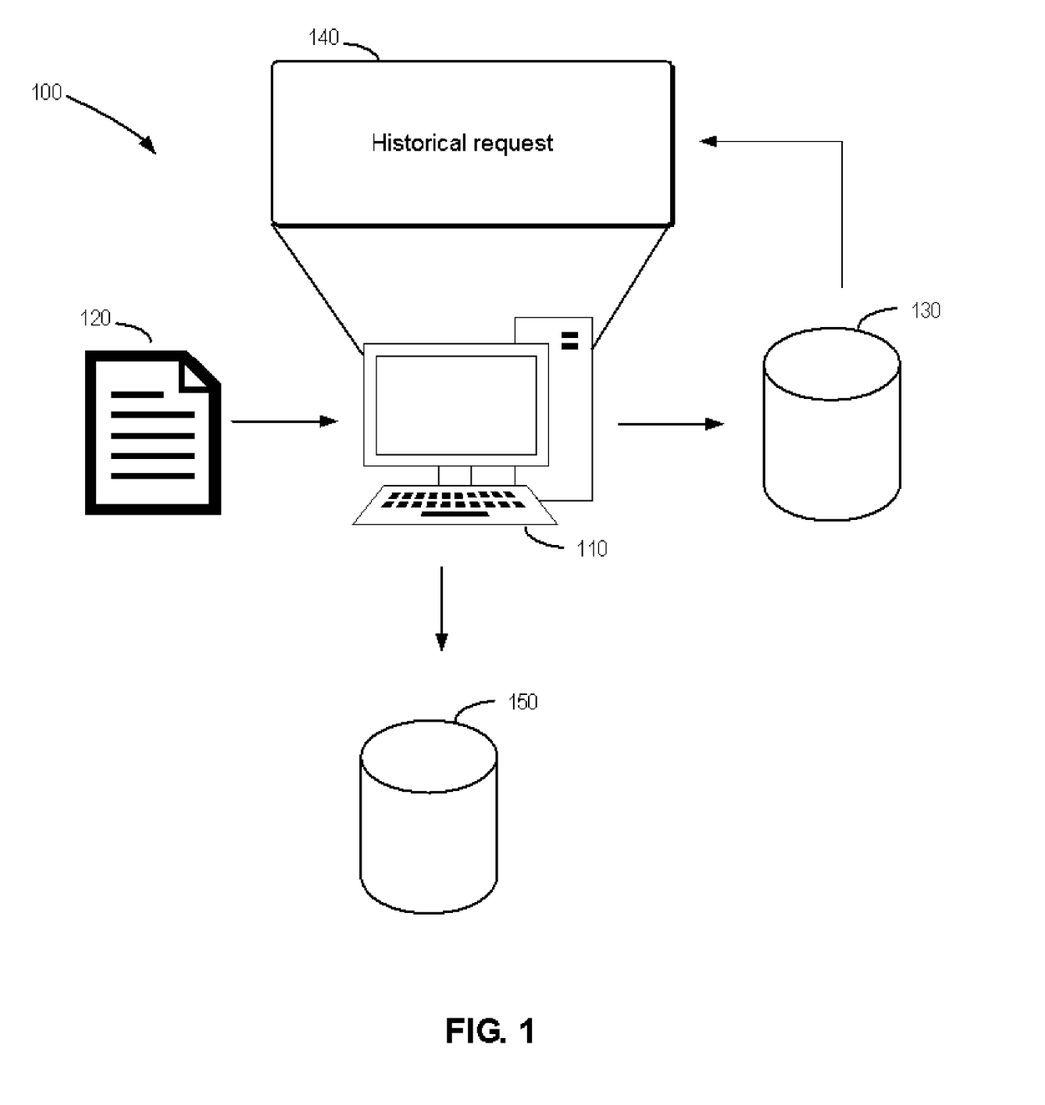
FIG. 1 is a schematic diagram of an example environment in which embodiments of the present disclosure can be implemented.

FIG. 1 is a schematic diagram of example environment 100 in which embodiments of the present disclosure can be implemented. As shown in FIG. 1, environment 100 includes computing device 110, examples of which include, but are not limited to: a cloud-side server, a smart phone, a notebook computer, a tablet computer, a desktop computer, an edge computing device, or the like. Computing device 110 may receive request 120. In a normal operation, after receiving request 120, computing device 110 will call a corresponding application to process request 120, and output corresponding real response 130. At the same time, computing device 110 stores real response 130 to historical request 140. In a simulation operation, for example, after receiving request 120, computing device 110 may perform a simulation to generate test response 150 to request 120 for subsequent processing. It should be understood that the architecture and functions in environment 100 are described only for exemplary purposes, without implying any limitation to the scope of the present disclosure. The embodiments of the present disclosure can also be applied to environments involving data protection systems with different structures and/or functions.

Figure 2:
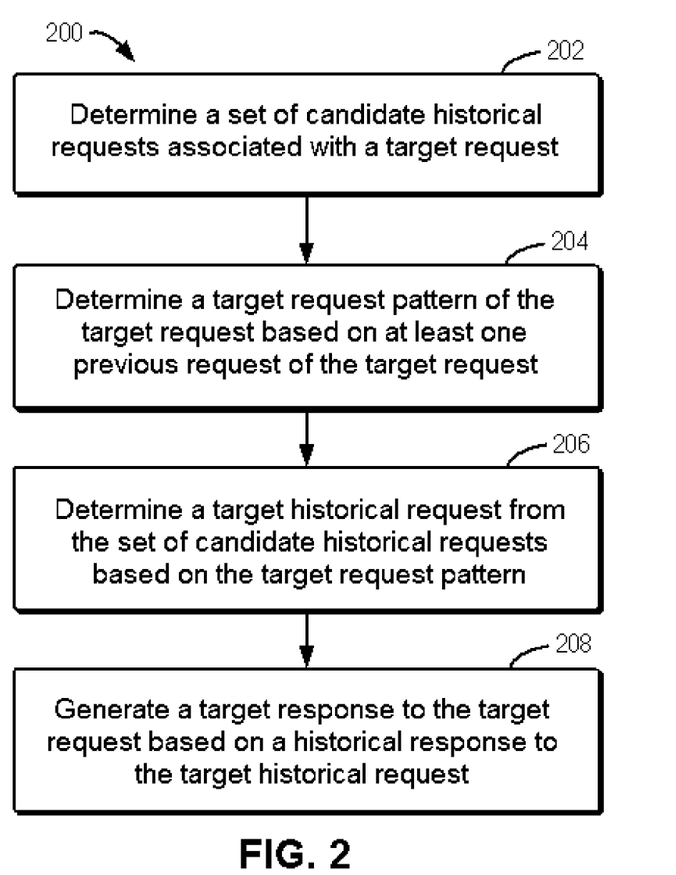
FIG. 2 is a flow chart of an example method of managing resources according to an embodiment of the present disclosure.

Example embodiments of the present disclosure will be described in detail below with reference to FIG. 2 to FIG. 4. FIG. 2 is a flow chart of example method 200 of managing resources according to an embodiment of the present disclosure. Method 200 may be performed by, for example, computing device 110 in FIG. 1.

As shown in FIG. 2, at block 202, computing device 110 determines a set of candidate historical requests associated with a target request. Here, the set of candidate historical requests has the same request type and target resource as the target request. Generally, a request includes a request type and a targeted resource. The request type indicates a requested "operation," such as requesting for resources, uploading resources, or deleting resources. In some embodiments, in the case that the request follows HTTP, the request type may be "GET," "POST," "PUT," and so on. In some embodiments, in the case that the request follows HTTP, the requested resource may be identified by a uniform resource identifier URI. In some embodiments, a historical request may be a request recorded during integration testing of a service, and a response to the historical request is also recorded.

At block 204, the computing device 110 determines a target request pattern of the target request based on at least one previous request of the target request. Generally, in order to implement a specific workflow, a plurality of corresponding specific requests are sent to the service in a certain order. Therefore, through at least one previous request of the target request, the workflow can be judged, and the target request pattern can be determined. The process of determining the request pattern will be described in detail below with reference to FIG. 3 and FIG. 4.

Figure 3:
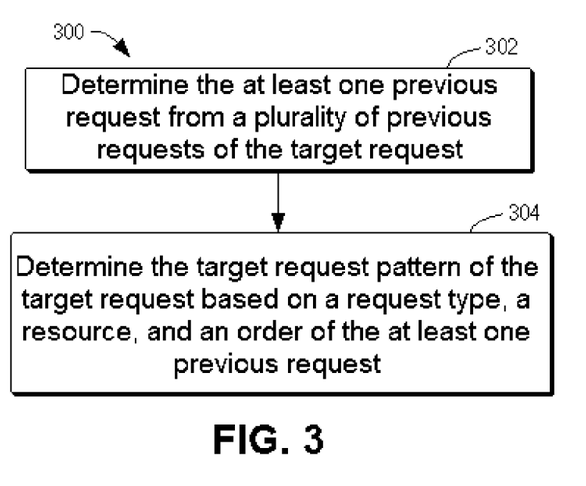
FIG. 3 is a flow chart of an example method of determining a target request pattern according to some embodiments of the present disclosure.

FIG. 3 is a flow chart of example method 300 of determining a target request pattern according to some embodiments of the present disclosure. Method 300 may be performed by, for example, computing device 110 in FIG. 1.

As shown in FIG. 3, at block 302, in order to determine the target request pattern of the target request, computing device 110 may determine at least one previous request from a plurality of previous requests of the target request. Here, one of the at least one previous request and the target request is associated with at least one other request. In the previous requests of the target request, not only the associated previous request in the workflow to which the target request belongs is included, but also some unassociated previous requests are included. Then, in order to accurately determine the target request pattern of the target request, it is necessary to select the previous request associated with the target request. In some embodiments, to determine whether two requests are associated with each other, the following criteria can be followed:

1. The two requests or their responses include the same resource information; and
2. resource information associated with one request and resource information associated with another request are included in the same third request or its response.

Here, the resource information is information associated with the resource targeted by the request, such as an ID or a name of the resource. When information associated with respective resources of two requests is included in the same third request, for example, it can indicate that the third request associates the resources targeted by the two requests, so that the two requests are associated with each other.

It should be understood that the above criteria for judging the association of requests are not only applicable to the target request and its previous requests, but also applicable to judging the association between historical requests.

At block 304, computing device 110 determines the target request pattern of the target request based on a request type, a resource, and an order of the at least one previous request.

The process of determining the target request pattern will be described in detail below with reference to FIG. 4.

Figure 4:
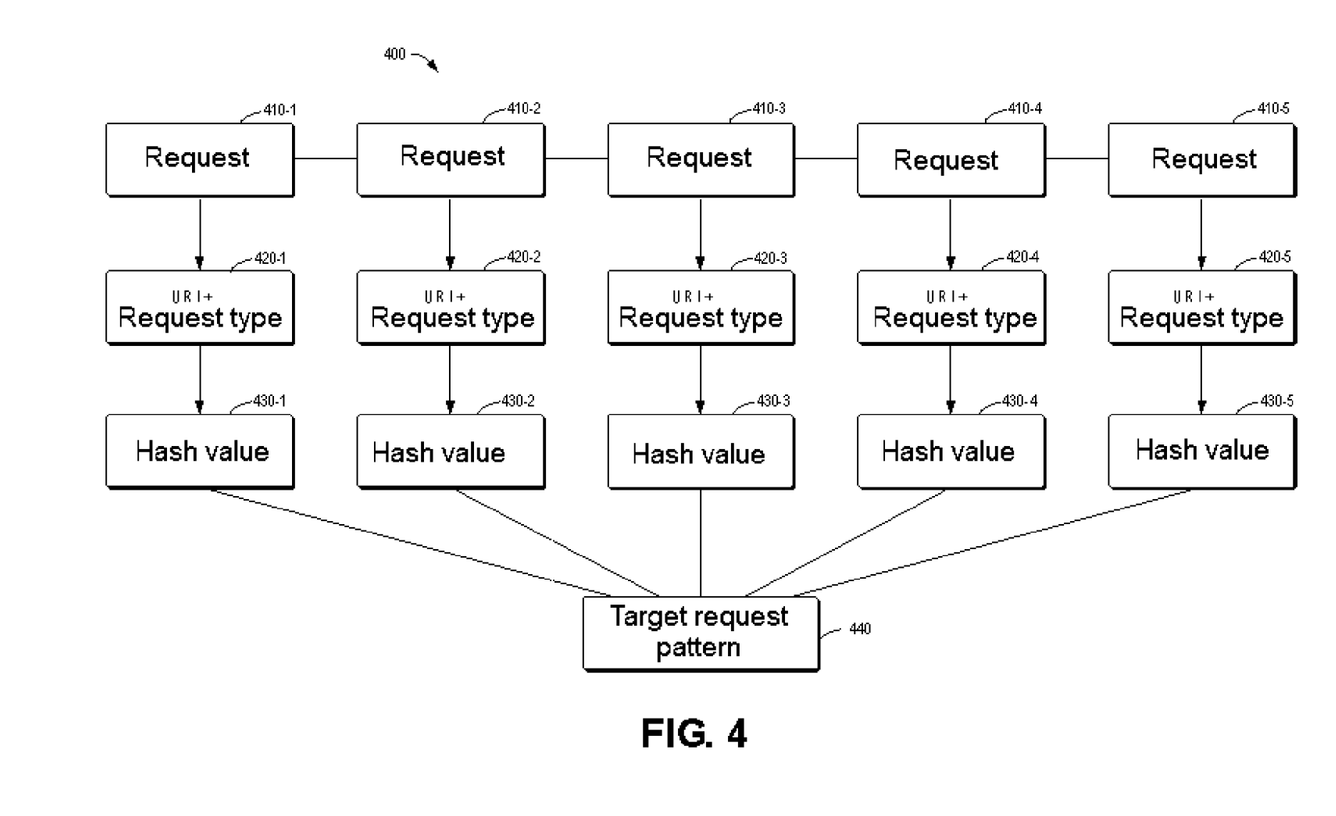
FIG. 4 is a schematic diagram of an example process of determining a target request pattern according to some embodiments of the present disclosure.

FIG. 4 is a schematic diagram of example process 400 of determining a target request pattern according to some embodiments of the present disclosure. As shown in FIG. 4, computing device 110 sequentially receives request 410-1, request 410-2, request 410-3, request 410-4, and request 410-5. Response contents of the requests and their responses are shown in Table 1.

Request 410-5 is to monitor a job in request 410-4. The request type of request 410-1 is "GET," an identification URI of the targeted resource is "jobs/2," and a response is obtained. The response includes a status code of 200, indicating that the request is successful, and a progress with a job ID of "1" is returned.

In the example embodiment, determining the association between requests is performed by referring to IDs of the resources. When request 410-3 has not been received,

TABLE 1

Request contents and their responses

| Request | Request Type | Resource ID | Request Body | Response |
|---|---|---|---|---|
| 410-1 | GET | /assets?filter=name like "sql"/ | | 200 [{ "id": "7", "name": "sql-server-1" ...2}, ... |
| 410-2 | POST | /protection-policies | { "name": "test-policy", "assetType": "MSSQL", "dataConsistency": "CRASH_CONSISTENT", ... | 201 { "id": "1", "name": "test-policy", ... |
| 410-3 | PUT | /protection-policies/1/assets-assign | [{ "id": 7 ... | 204 |
| 410-4 | POST | /protection-policies/ 1 /backups | { assets "all", ... | 201 { "id": "2", ... |
| 410-5 | GET | /jobs/2 | | 200 { "id": "2", "progress": "30%", |

As shown in Table 1, request 410-1 is to search for an asset by a name "sql." The request type of request 410-1 is "GET," an identification of the targeted resource, for example, a URI is "/assets?filter=name like "sql"," and a response is obtained. The response includes a status code of 200, indicating that the request is successful, and an asset with an asset name "sql-server-1" and an ID "7" is returned.

Request 410-2 is to create a policy. The request type of request 410-2 is "POST," an identification URI of the targeted resource is "/protection-policies," the content of the policy is in the request body, and a response is obtained. The response includes a status code 201, indicating that it has been created, and a policy with a name "test-policy" and an ID "1" is returned.

Request 410-3 is to allocate the asset in request 410-1 to the policy in request 410-2. The request type of request 410-3 is "PUT," an identification URI of the targeted resource is "/protection-policies/1/assets-assign," the specific content of the request is in the request body, and a response is obtained. The response includes the status code 204 No Content.

Request 410-4 is to trigger protection of the policy. The request type of request 410-4 is "POST," an identification URI of the targeted resource is "/protection-policies/1/backups," the job specified in the request is in the request body, and a response is obtained. The response includes a status code of 200, indicating that the request is successful, and an asset with a job ID of "2" is returned.

request 410-1 is to search for assets, and request 410-2 is to create a policy. At this time, the two requests are not associated. In addition, the response of request 410-1 includes an ID "7," and the response of request 410-2 has an ID "1," which does not meet the criteria for determining the association. However, when request 410-3 is received, the association between request 410-1 and request 410-2 is established, and both the ID "7" and the ID "1" appear in the request body of request 410-3, thus meeting the criteria for judging the association. In addition, the request of request 410-4 includes the ID "1," so request 410-4 is associated with request 410-3. Finally, the request of request 410-5 includes the ID "2," and the response of request 410-4 also includes the ID "2," so request 410-4 is associated with request 410-5. Therefore, it can be considered that request 410-1, request 410-2, request 410-3, request 410-4, and request 410-5 are all associated. It should be understood that the request content and response content shown here are only examples, and the scope of the present disclosure is not limited by the content shown here. The request type may also include, for example, other types specified in HTTP, and the targeted resources are not limited to assets, policies, and jobs. Although the target request and its previous request are described here, in some embodiments, request 410-1, request 410-2, request 410-3, request 410-4, and request 410-5 can also be regarded as historical requests, and the relevant description content is also applicable to the historical requests. For the sake of brevity, the determination of the association of historical requests will not be described in detail here.

Returning to FIG. 4, the request types and resource identifications, such as URIs, are determined from request 410-1, request 410-2, request 410-3, request 410-4, and request 410-5, thereby obtaining combination 420-1, combination 420-2, combination 420-3, combination 420-4, and combination 420-5 of request types and resource identifications. After the combinations of the request types and the resource identifications are obtained, in order to facilitate the identification of each combination, in some embodiments, a hash value of each combination may be calculated based on characters of the request type and the resource identification. As shown in FIG. 4, for example, hash value 430-1 for request 410-1, hash value 430-2 for request 410-2, hash value 430-3 for request 410-3, hash value 430-4 for request 410-4, and hash value 430-5 for request 410-5 are obtained. It should be understood that the identification of the combination is not limited to the hash value, and a symbol or number generated by any other known method can also be used. Finally, a generated sequence of the hash values is target request pattern 440. It should be understood that the target request pattern in the form of a hash value sequence is only an example, and other forms are also feasible, for example, in the form of a sequence of combinations of URIs and request types.

In some embodiments, when a query parameter is included in the resource identification in the request, such as "filter=name like "sql"" in request 410-1, the resource identification may or may not include the query parameter. In some embodiments, it is also possible to set weights for query parameters and/or resource identifications and/or request types as needed, so as to more accurately characterize the association between requests.

In some embodiments, when determining the target request pattern of the target request, computing device 110 may also remove a repeated request from at least one previous request. Here, the repeated request has the same response as the other requests in the at least one previous request. In other words, a request that has no impact on the response will be removed, thereby simplifying the target request pattern and improving the simulation efficiency.

Returning to FIG. 2, at block 206, computing device 110 determines a target historical request from the set of candidate historical requests based on the target request pattern. The process of determining the target historical request will be described in detail below with reference to FIG. 5.

Figure 5:
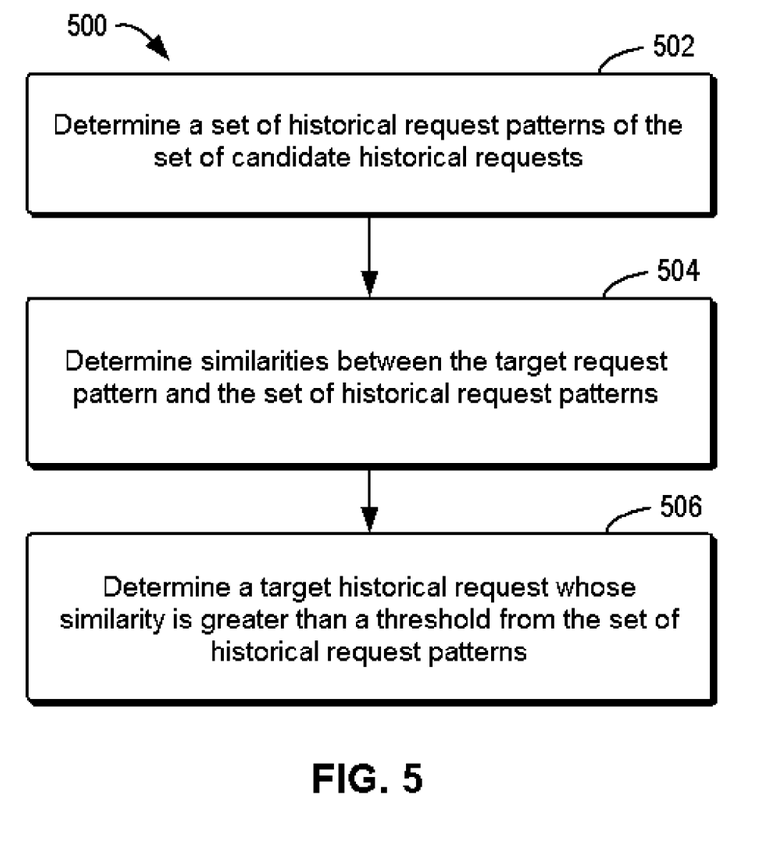
FIG. 5 is a flow chart of an example method of determining a target historical request according to some embodiments of the present disclosure.

FIG. 5 is a flow chart of example method 500 of determining a target historical request according to some embodiments of the present disclosure. Method 500 may be performed by, for example, computing device 110 in FIG. 1.

As shown in FIG. 5, at block 502, computing device 110 may determine a set of historical request patterns for the set of candidate historical requests. The historical request pattern may be determined adaptively according to the example method in the embodiments shown in FIG. 3 and FIG. 4. It will not be repeated here.

At block 504, computing device 110 determines similarities of the target request pattern to the set of historical request patterns. In some embodiments, the similarities of the target request pattern to the set of historical request patterns may indicate the number of requests with the same request type and targeted to the same resource. For example, in the case where the hash value of the combination of the request type and the resource identification is calculated, the similarity indicates the number of identical hash values in the two request patterns. In some embodiments, the longest common subsequence algorithm may be used to determine the similarity. For example, the target request pattern is [2, 7, 8, 10], a first historical request pattern of a first candidate request is [1, 3, 8, 10], and a second historical request pattern of a second candidate request is [2, 4, 8, 10]. Then, the longest common subsequence of the first historical request pattern and the target request pattern is [8, 10], and the longest common subsequence of the second historical request pattern and the target request pattern is [2, 8, 10]. Thus, for example, it can be determined that the similarity between the first historical request pattern and the target request pattern is 2, and the similarity between the second historical request pattern and the target request pattern is 3.

At block 506, computing device 110 determines a target historical request whose similarity is greater than a threshold from the set of historical request patterns. In some embodiments, a candidate historical request having the historical request pattern with the greatest similarity may be determined as the target historical request. With reference to the above embodiment, the second candidate historical request having the second historical request pattern with the greatest similarity is selected as the target historical request.

Returning to FIG. 2, at block 208, computing device 110 generates a target response to the target request based on a historical response to the target historical request. Once the target historical request is determined, computing device 110 may start to process the response to the target historical request, for generating the target response to the target request.

In some embodiments, in order to generate a target response to a target request, computing device 110 may determine a format of the target historical response. Here, the format indicates a set of response fields included in the target historical response. For example, the target request is "GET/protection-policies/1," and the determined target historical response includes the following fields: "id," "name," "assetType," and "dataConsistency." Accordingly, computing device 110 determines that the target response will also include these fields. After that, computing device 110 determines a field that matches the request field of the target request and a field that does not match the request fields of the target request in the response field. For example, the request field also includes the matched field "id" and the unmatched fields "name," "assetType," and "dataConsistency." On this basis, computing device 110 assigns value "1" of the field "id" in the target request to the field "id" in the target response, and assigns values of the fields "name," "assetType," and "dataConsistency" in the historical target response to the fields "name," "assetType," and "dataConsistency" in the target response. For example, values "testpolicy," "MSSQL," and "CRASH CONSISTENT" in the fields in the historical target response are assigned to the fields "name," "assetType," and "dataConsistency" in the target response to get the following target response:

```
{
 "id": "1",
 "name": "test-policy",
 "assetType": "MSSQL",
 "dataConsistency": "CRASH_CONSISTENT"
 ...}.
```

In this way, first, historical request patterns are determined from a large number of integration tests and OAS definitions, and then a received new target request pattern is determined in the process of simulating the microservices. By comparing the target request pattern with the historical request patterns, the target historical request that is closest to the target request is determined. Finally, based on a response to the target historical request, a target response in line with the context can be generated, which is helpful for the early integration of a plurality of microservice products, without the need to generate specific responses according to situations, thus improving the product quality and production efficiency.

In some embodiments, after a path of a historical request is acquired, a hash value may be calculated based on a URI and a request type of the request. In some implementations, a hash value lookup table can also be established based on the calculated hash value. Here, the hash value lookup table includes key-value pairs for historical requests. A set of key-value pairs includes historical request indices and hash values of historical requests. In this way, candidate historical requests can be quickly found.

Figure 6:
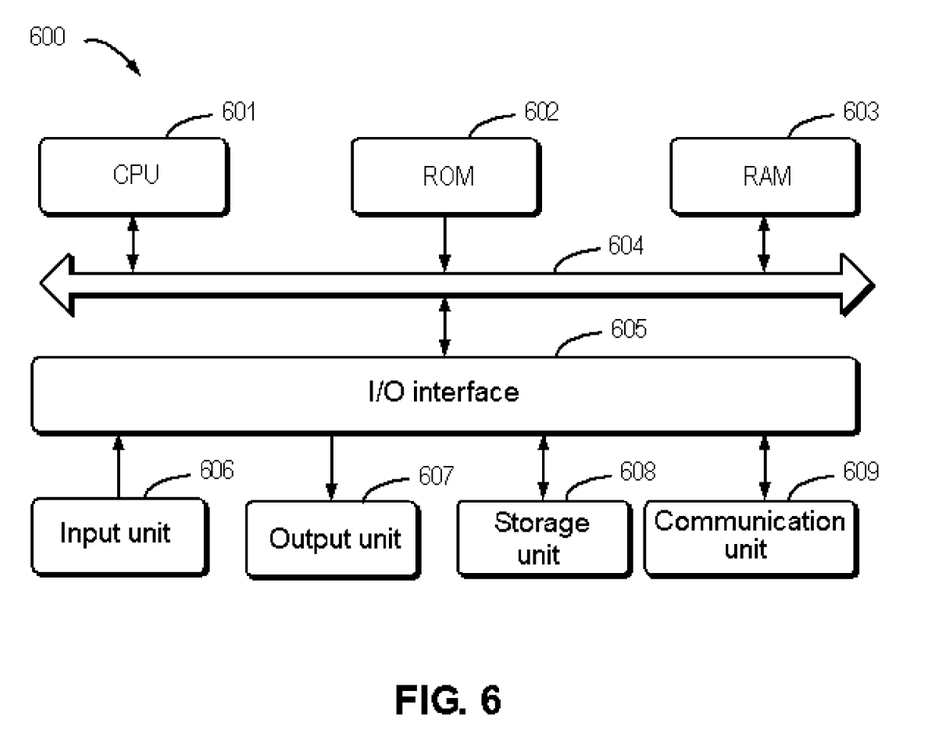
FIG. 6 is a block diagram of an example device that can be used to implement embodiments of the present disclosure.

FIG. 6 illustrates a schematic block diagram of example device 600 that can be used to implement the embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. In RAM 603, various programs and data required for the operation of device 600 may also be stored. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various processes and processing described above, for example, methods 200, 300, and 500, may be executed by processing unit 601. For example, in some embodiments, method 200, method 300, and method 500 may be implemented as a computer software program that is tangibly included in a machine-readable medium such as storage unit 608. In some embodiments, part or all of the computer programs may be loaded and/or installed onto device 600 via ROM 602 and/or communication unit 609. When the computer program is loaded to RAM 603 and executed by CPU 601, one or more actions of method 200, 300, and 500 described above may be executed.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in the computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming language such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer may be connected to a user computer through any kind of networks, including a local area network (LAN) or a wide area network (WAN), or may be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented by using a special hardware-based system that executes specified functions or actions, or implemented using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method of managing resources, comprising:
   determining a set of candidate requests, the set of candidate requests having a same request type and target resource as a target request;
   determining a request pattern of the target request based on a first occurrence of the target request, wherein at least one of the first occurrence of the target request or the target request is associated with a third request, and resource information associated with the target request is included in at least one of:
      the first occurrence of the target request and a response to the first occurrence of the target request;
      the third request and a response to the third request; or
      another request and a response to the other request;
      determining a candidate request from the set of candidate requests based on the request pattern;
   generating a response to the target request based on a response to the candidate request, where the generating comprises:
      determining a format of a candidate response, the format indicating a set of response fields comprised in the candidate response;
      determining a first set of fields in the set of response fields that match a set of request fields of the target request; and
      generating a target response in the format based on a first set of values associated with the first set of fields in the target request, wherein the generating comprises:
         determining a second set of fields in the set of response fields that do not match the set of request fields of the target request;
         determining a second set of values associated with the second set of fields in the candidate response; and
         generating the target response based on the first set of values and the second set of values;
   transmitting the response to a simulation server; and
   causing the simulation server to use the response in a simulation operation.

2. The method according to claim 1, wherein determining the request pattern of the target request further comprises:
   determining the request pattern of the target request based on a request type, a resource, and an order of the first occurrence of the target request.

3. The method according to claim 2, wherein first occurrence of the target request and the target request being associated with the third request indicates:
   resource information associated with at least one of the target request or the first occurrence of the target request are included in a fourth request or a response to the fourth request.

4. The method according to claim 1, wherein determining the request pattern of the target request further comprises:
   removing a repeated request from the first occurrence of the target request, the repeated request having a same response as other requests in the first occurrence of the target request.

5. The method according to claim 1, wherein determining a candidate request from the set of candidate requests comprises:
   determining a set of request patterns of the set of candidate requests; and
   determining the candidate request from the set of candidate requests based on a comparison between the request pattern and the set of request patterns.

6. The method according to claim 5, wherein determining the candidate request from the set of candidate requests comprises:
determining a similarity between the request pattern and the set of request patterns; and
determining the candidate request whose similarity to the set of request patterns is greater than a threshold.

7. The method according to claim 6, wherein the similarity of the request pattern to the set of request patterns indicates a number of requests with the same request type and targeted to a resource.

8. The method according to claim 1, wherein determining a set of candidate requests associated with the target request comprises:
determining a hash value associated with the target request based on the request type and the target resource of the target request; and
determining the set of candidate requests with the hash value from a historical request set.

9. The method according to claim 8, wherein the historical request set is obtained from a hash value lookup table.

10. The method according to claim 1, wherein the request type is at least one of:
requesting resources;
uploading resources; or
deleting resources.

11. The method according to claim 1, wherein the set of candidate requests was recorded during integration testing of a service.

12. An electronic device, comprising:
a processor; and
a memory coupled to the processor, the memory having instructions stored therein, and the instructions, when executed by the processor, causing the electronic device to perform actions comprising:
determining a set of candidate requests, the set of candidate requests having a same request type and target resource as a target request;
determining a request pattern of the target request based on a first occurrence of the target request, wherein at least one of the first occurrence of the target request or the target request is associated with a third request, and resource information associated with the target request is included in at least one of:
the first occurrence of the target request and a response to the first occurrence of the target request;
the third request and a response to the third request; or
another request and a response to the other request;
determining a candidate request from the set of candidate requests based on the request pattern;
generating a response to the target request based on a response to the candidate request, where the generating comprises:
determining a format of a candidate response, the format indicating a set of response fields comprised in the candidate response;
determining a first set of fields in the set of response fields that match a set of request fields of the target request; and
generating a target response in the format based on a first set of values associated with the first set of fields in the target request, wherein the generating comprises:
determining a second set of fields in the set of response fields that do not match the set of request fields of the target request;
determining a second set of values associated with the second set of fields in the candidate response; and
generating the target response based on the first set of values and the second set of values;
transmitting the response to a simulation server; and
causing the simulation server to use the response in a simulation operation.

13. The electronic device according to claim 12, wherein determining the request pattern of the target request comprises:
determining the request pattern of the target request based on a request type, a resource, and an order of the first occurrence of the target request.

14. The electronic device according to claim 13, wherein the first occurrence of the target request and the target request being associated with the third request indicates at least one of:
resource information associated with at least one of the target request or the first occurrence of the target request are included in a fourth request or a response to the fourth request.

15. The electronic device according to claim 12, wherein determining the request pattern of the target request further comprises:
removing a repeated request from the first occurrence of the target request, the repeated request having a same response as other requests in the first occurrence of the target request.

16. The electronic device according to claim 12, wherein determining a candidate request from the set of candidate requests comprises:
determining a set of request patterns of the set of candidate requests; and
determining the candidate request from the set of candidate requests based on a comparison between the request pattern and the set of request patterns.

17. The electronic device according to claim 16, wherein determining the candidate request from the set of candidate requests comprises:
determining a similarity between the request pattern and the set of request patterns; and
determining the candidate request whose similarity to the set of request patterns is greater than a threshold.

18. The electronic device according to claim 17, wherein the similarity of the request pattern to the set of request patterns indicates a number of requests with the same request type and targeted to a resource.

19. The electronic device according to claim 12, wherein determining a set of candidate requests associated with the target request comprises:
determining a hash value associated with the target request based on the request type and the target resource of the target request; and
determining the set of candidate requests with the hash value from a historical request set.

20. A non-transitory machine-readable medium having instructions stored therein, which when executed by a processor, cause the processor to perform actions, the actions comprising:
determining a set of candidate requests, the set of candidate requests having a same request type and target resource as a target request;
determining a request pattern of the target request based on a first occurrence of the target request, wherein at least one of the first occurrence of the target request or the target request is associated with a third request, and resource information associated with the target request is included in at least one of:
the first occurrence of the target request and a response to the first occurrence of the target request;
the third request and a response to the third request; or
another request and a response to the other request;
determining a candidate request from the set of candidate requests based on the request pattern;
generating a response to the target request based on a response to the candidate request, where the generating comprises:
   determining a format of a candidate response, the format indicating a set of response fields comprised in the candidate response;
   determining a first set of fields in the set of response fields that match a set of request fields of the target request; and
   generating a target response in the format based on a first set of values associated with the first set of fields in the target request, wherein the generating comprises:
      determining a second set of fields in the set of response fields that do not match the set of request fields of the target request;
      determining a second set of values associated with the second set of fields in the candidate response; and
      generating the target response based on the first set of values and the second set of values;
transmitting the response to a simulation server; and
causing the simulation server to use the response in a simulation operation.

* * * * *